April 17, 1934.  L. LINK  1,955,246
PROCESS FOR THE DISTILLATION OF HYDROCARBON OILS
Filed Oct. 23, 1928
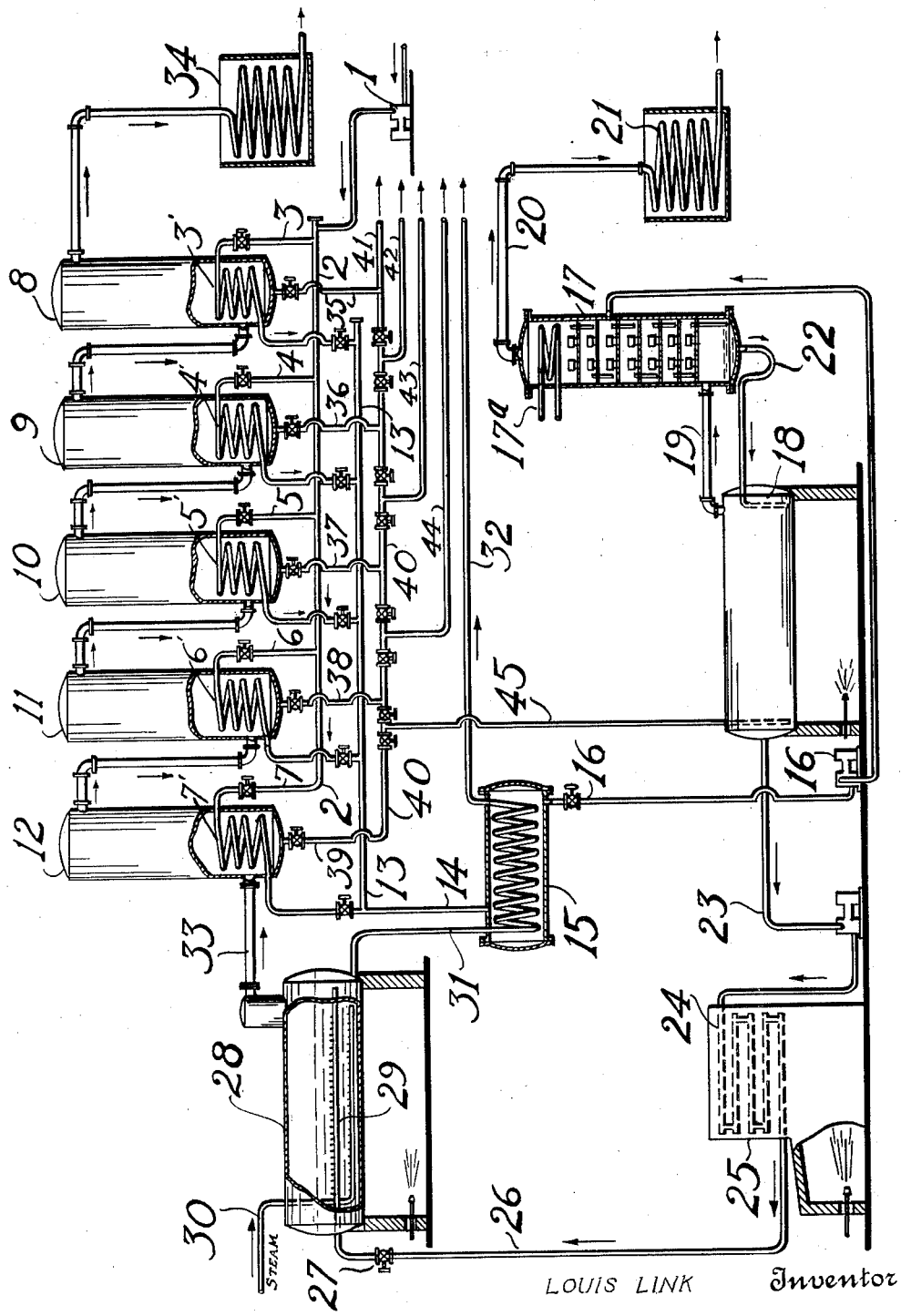
LOUIS LINK  Inventor
By his Attorney Patented Apr. 17, 1934

1,955,246

UNITED STATES PATENT OFFICE 1,955,246

PROCESS FOR THE DISTILLATION OF HYDROCARBON OILS

Louis Link, Baton Rouge, La., assignor to Standard Oil Development Company, a corporation of Delaware Application October 23, 1928, Serial No. 314,494

2 Claims. (Cl. 196—82)

The present invention relates to the art of refining hydrocarbon oils and more specifically comprises an improved method for distilling crude oil, reduced crude oil and the like for obtaining paraffin distillates and lubricating oils. A principal object of the invention is to produce good yields of paraffin distillate which will press readily. This is accomplished by heating the feed oil to a high temperature without substantial cracking in a pipe coil while flowing rapidly through it, and then providing means for retaining the heavier part of the crude fractions in a tank still a reasonable length of time, so as to permit the paraffin fractions to disengage from the residue, and for the wax fractions to properly flake and crystallize. My invention will be fully disclosed in the following description and the drawing.

The drawing is a semi-diagrammatic view in sectional elevation of an apparatus constructed according to my invention and indicates the flow of oil therethrough.

Referring to the drawing, numeral 1 denotes a feed pump which draws crude oil or reduced crude or any suitable cut therefrom from storage (not shown) and forces the oil through a manifold 2. Manifold 2 is provided with valved branch pipes 3, 4, 5, 6, and 7 and coils 3', 4', 5', 6', and 7' which are placed in towers 8, 9, 10, 11, and 12 respectively. The outlets of the coils are connected into a second manifold 13 as will be understood. The oil is then conducted by pipe 14 to a heat exchanger 15 for further preheat and thence by line 16 to a rectification tower 17 in connection with a still 18. The towers may be of any particular form but bellcap plate towers are preferred. A vapor line 19 leads from still 18 to tower 17 and a second vapor line 20 conducts vapor from the tower to condenser 21 and thence to storage (not shown). A coil condenser 17a is preferably provided in the upper part of tower 17 and reflux from the tower is run to still 18 by a trapped line 22. It will be understood that other types of overhead equipment may be substituted for tower 17, capable of producing closely fractionated cuts of naphtha, heavy naphtha, and water white distillate.

Bottoms from still 18 are removed by line 23 and pumped through a heated pipe coil 24 mounted in a suitable furnace setting 25. The coil discharges through a line 26 which is fitted with a pressure reduction valve 27 into a still 28 by means of a spray pipe 29, below the surface of liquid. Steam may also be injected into the still by line 30 and a fluid residuum is removed by line 31, through exchanger 15, and by line 32 to storage (not shown). Still 28 provides a relatively large surface for evaporation.

Vapor from still 28 is conducted by line 33 to towers 8, 9, 10, 11, and 12, above referred to, which are arranged in series and connected by vapor lines so that vapor flows through the series in the reverse of the order named. From the last tower 8 vapor is conducted to a condenser 34 and to storage (not shown) and from the base of each of the towers 8, 9, 10, 11, and 12, lines 35, 36, 37, 38, and 39 are provided to conduct condensate to a manifold 40. Branch lines 41, 42, 43, and 44 connect with the manifold which is fitted with suitable valves, so that condensates from the towers may be withdrawn separately to storage (not shown) or may be blended as will be readily understood. A pipe 45 also connects with manifold 40 and conducts condensate from tower 12 or from towers 11 and 12 to still 18 for recirculation through coil 24 and into still 28 as above disclosed.

In the operation of my process, crude oil or reduced crude or any suitable cut therefrom is preheated and distilled in still 18 and tower 17 for removal of low boiling oils such as naphtha and heavy naphtha and although kerosene may also be removed in this distillation, it is sometimes preferable to retain it in the residuum. This residuum is then pumped rapidly through the fired coil 24 or other apparatus suitable for heating the oil to a high temperature without material decomposition. I prefer to heat the oil above cracking temperature but to accomplish this so rapidly that very little decomposition occurs. Temperature in the neighborhood of 800 to 850° F. has been found to be satisfactory with feed rates of about 4000 gallons per hour through a 4 inch coil of suitable length, under which conditions very little decomposition occurs. With higher temperatures greater feed rate with a longer coil, is desirable.

The heated oil is then discharged into still 28 preferably through a spray pipe beneath the surface of the oil. The coil is preferably maintained under only sufficient pressure to force the oil through. It is generally unnecessary to fire the still but sometimes it is desirable. Temperature of about 700 or 730° F. is maintained in the still to produce a tarry residue which is continually withdrawn. Still 28 provides a relatively large surface from which the oil is distilled, for example at a rate of 15 to 20 gallons per hour per square foot of evaporation surface. I have found that the coil temperature must be adjusted carefully to produce the best quality of distillate. The heat contained in the oil discharged into the still 28 is great enough to bring on rapid distillation, and if not checked would compare closely to the so-called flash tower distillation. Employing this type of distillation it is not expected to produce an appreciable amount of good pressing paraffin distillate from the charge. It is necessary to hold the heavier part of the crude fractions in the still a reasonable length of time, so as to permit the paraffin fractions to disengage from the residue and so as to provide sufficient time for the wax fractions to properly flake and crystallize.

To bring this about, a certain amount of liquid is steadily carried in the still 28, and the oil coming from the coil is discharged into the still below the liquid, preferably through a spray. With some grades of charging stock it may be permissible to carry the liquid level in the still 28 rather low, while other grades of charging stock make it necessary to retain a great deal of liquid in the still.

Vapor from the still is then separated by partial condensation or rectification to produce condensates which are drawn from the base of each tower and a distillate from the last tower. Condensate from towers 8 and 9 will ordinarily be kerosene or water white distillates which are conducted to storage. Distillate from tower 8 is cracked naphtha which will generally be small in quantity together with other light distillates not removed in still 18. Condensates from towers 10 and 11 are paraffin distillate and the heavy condensate from tower 12 is returned to still 18 for recirculation through the heated coils, as above noted.

Cold feed is preferably used in towers 8 to 12 as cooling medium to produce condensation and is itself suitably preheated.

The paraffin or wax distillate produced by my process is of excellent quality and can be easily pressed and sweated according to the usual refining methods. Heretofore it has been impossible to produce a large quantity of good quality paraffin distillate by the coil heating method, sometimes known as the flash vaporization system without resort to relatively high vacuum, since the distillates cannot be pressed and sweated by the usual refining methods.

As an example of my method, an Oklahoma crude having a gravity of 37 A. P. I. is distilled in a system similar to that described above, the pressure being only slightly above atmospheric and temperature at the outlet of the coil 815–835° F. The following products are obtained:

| | | |
|---|---|---|
| Light naphtha | 24.68% | 63° A.P.I. |
| Heavy naphtha | 6.92 | 50° |
| Cracked naphtha and gas oil | 17.48 | 42° |
| Water white | 9.49 | 42° |
| Paraffin distillate | 33.42 | 29° |
| Residuum | 6.44 | 8° |
| Gas and loss | 1.81 | |
| Coke | Nil | |

The paraffin distillate is of excellent quality having a viscosity of 65 seconds Saybolt at 100° F. and pour of 65° F. and on pressing gave 14.88% slack wax and 85.12% pressed oil after being blended with foots oil in the usual manner.

My method, while it is applicable and useful in reducing waxless crudes such as Texas Gulf crudes, is of particular value for wax-bearing crudes such as Pennsylvania and Mid-Continent crudes to produce large yields of good grade paraffin distillate. My invention is not to be limited by any theory of the mechanism of the process nor by any example given merely by way of illustration, but only by the following claims in which I wish to claim all novelty inherent in the invention.

I claim:

1. In a method for the distillation of petroleum oil for the production of directly pressable paraffin distillate, the improvement which comprises heating the oil under superatmospheric pressure in a coil to a temperature in excess of that at which cracking tends to occur, maintaining the oil flow through the coil at such a rate as to prevent extensive cracking, reducing the pressure to not substantially below normal atmospheric pressure and discharging the heated oil in a large number of finely divided streams at a substantial distance below the surface of the body of oil, taking off oil vapors therefrom, fractionating the vapors to produce several cuts including a directly pressable paraffin distillate cut, and continuously removing oil from said body to maintain the level therein.

2. In the distillation of petroleum oil for the production of pressable directly paraffin distillate, the improvement which comprises heating the oil under atmospheric pressure in a coil to a temperature in excess of that at which cracking tends to occur, maintaining the oil flow through the coil at such a rate as to prevent extensive cracking, reducing the pressure to not substantially below normal atmospheric pressure and discharging the heated oil in a large number of finely divided streams at a substantial distance below the surface of a body of the oil, and by the heat contained in these finely divided streams of oil, effecting the distillation of this body of oil, fractionating the resulting vapors to produce several cuts including a directly pressable paraffin distillate cut, and continuously removing oil from said body of oil to maintain a definite level of oil over the entering finely divided streams of heated oil.

LOUIS LINK.